United States Patent
Lee et al.

(10) Patent No.: US 10,532,727 B2
(45) Date of Patent: Jan. 14, 2020

(54) METHOD AND DEVICE FOR CONTROLLING FULL LOAD MODE OF HYBRID VEHICLE

(71) Applicants: HYUNDAI MOTOR COMPANY, Seoul (KR); KIA MOTORS CORPORATION, Seoul (KR)

(72) Inventors: Jeamun Lee, Seoul (KR); Joonyoung Park, Seoul (KR); Ji Hoon Kang, Seoul (KR)

(73) Assignees: HYUNDAI MOTOR CORPORATION, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 15/634,470

(22) Filed: Jun. 27, 2017

(65) Prior Publication Data
US 2018/0162352 A1   Jun. 14, 2018

(30) Foreign Application Priority Data
Dec. 12, 2016 (KR) .......................... 10-2016-0168884

(51) Int. Cl.
*B60W 20/11* (2016.01)
*B60W 20/13* (2016.01)
(Continued)

(52) U.S. Cl.
CPC ............ *B60W 20/11* (2016.01); *B60W 10/06* (2013.01); *B60W 10/08* (2013.01); *B60W 20/12* (2016.01); *B60W 20/13* (2016.01); *B60W 50/0097* (2013.01); *B60W 2420/52* (2013.01); *B60W 2510/244* (2013.01); *B60W 2520/10* (2013.01);
(Continued)

(58) Field of Classification Search
None
See application file for complete search history.

(56) References Cited

U.S. PATENT DOCUMENTS

| | | | | |
|---|---|---|---|---|
| 2002/0107618 A1* | 8/2002 | Deguchi | ................ | B60K 6/442 701/22 |
| 2012/0053773 A1* | 3/2012 | Gustavsson | ............... | B66C 3/04 701/22 |
| 2016/0375789 A1* | 12/2016 | Park | ........................ | B60L 58/12 701/22 |

FOREIGN PATENT DOCUMENTS

| | | |
|---|---|---|
| KR | 10-1251502 B | 9/2004 |
| KR | 10-0448381 B | 4/2013 |
| KR | 10-1588793 B | 1/2016 |

* cited by examiner

*Primary Examiner* — Jonathan M Dager
*Assistant Examiner* — Garrett F Evans
(74) *Attorney, Agent, or Firm* — Brinks Gilson & Lione

(57) ABSTRACT

A method for controlling a full load mode of a hybrid vehicle by a controller may include: calculating driver demand torque based on acceleration pedal position sensor (APS) information or brake pedal position sensor (BPS) information; predicting the driver's acceleration/deceleration information based on the hybrid vehicle's driving information; predicting the driver demand torque based on the predicted acceleration/deceleration information; predicting a state of charge (SOC) of a battery that supplies electric power to a motor for driving the hybrid vehicle, based on the calculated driver demand torque and the predicted driver demand torque; and controlling an engine for charging the battery based on the predicted battery SOC, in order to keep the hybrid vehicle from entering into the full load mode in which the engine configured to produce a maximum torque and the motor are used.

12 Claims, 5 Drawing Sheets

(51) Int. Cl.
  *B60W 10/06* (2006.01)
  *B60W 10/08* (2006.01)
  *B60W 50/00* (2006.01)
  *B60W 20/12* (2016.01)
(52) U.S. Cl.
  CPC ..... *B60W 2540/10* (2013.01); *B60W 2540/12* (2013.01); *B60W 2540/30* (2013.01); *B60W 2550/302* (2013.01); *B60W 2550/308* (2013.01); *B60W 2550/402* (2013.01); *B60W 2710/0666* (2013.01); *B60W 2710/083* (2013.01); *B60W 2710/244* (2013.01); *Y02T 10/6286* (2013.01); *Y10S 903/93* (2013.01)

METHOD AND DEVICE FOR CONTROLLING FULL LOAD MODE OF HYBRID VEHICLE

CROSS-REFERENCE TO RELATED APPLICATION

The present application claims priority to and the benefit of Korean Patent Application No. 10-2016-0168884, filed on Dec. 12, 2016, which is incorporated herein by reference in its entirety.

FIELD

The present disclosure relates to a hybrid vehicle (hybrid electric vehicle), and more particularly, to a method and device for controlling full load mode of a hybrid vehicle.

BACKGROUND

The statements in this section merely provide background information related to the present disclosure and may not constitute prior art.

Environmentally-friendly vehicles include fuel-cell vehicles, electric vehicles, plug-in vehicles, and hybrid vehicles. They typically have a motor for generating driving force.

A hybrid vehicle, which is an example of such environmentally-friendly vehicles, uses an internal combustion engine and battery power together. That is, the hybrid vehicle efficiently combines the power of the internal combustion engine and the electric power from the motor.

A hybrid vehicle may include an engine, a motor, an engine clutch that controls power between the engine and the motor, a transmission, a differential gear mechanism, a battery, a starter generator that starts the engine or generates power based on the engine's output, and car wheels.

Further, the hybrid vehicle may include a hybrid control unit that controls the overall operation of the hybrid vehicle, an engine control unit that controls the operation of the engine, a motor control unit that controls the operation of the motor, a transmission control unit that controls the operation of the transmission, and a battery control unit that controls and manages the battery.

The battery controller may be called a battery management system. The starter generator also may be called an ISG (integrated starter & generator) or an HSG (hybrid starter & generator).

The hybrid vehicle may operate in operation modes such as EV mode (electric vehicle mode), which runs the vehicle as a pure electric vehicle, powered solely by the motor, HEV mode (hybrid electric vehicle mode), which uses the engine's rotational force as main power and the motor's rotational force as auxiliary power, and regenerative braking mode, which recovers braking and inertial energy by the motor during braking or inertial driving and stores it in the battery.

A hybrid vehicle uses two power sources—that is, the engine and the motor, which constitute a variety of power transmission structures. Since the hybrid vehicle uses a motor using electrical energy, as well as the engine, the management of a state of charge (SOC) of the battery that stores electrical energy is important.

The above information disclosed in this Background section is only for enhancement of understanding of the background of the present disclosure and therefore it may contain information that does not form the prior art that is already known to a person of ordinary skill in the art.

SUMMARY

The present disclosure provides a method and device for controlling full load mode of a hybrid vehicle, which can predict the vehicle's entry into full load mode and inhibit the vehicle's entry into full load mode by predicting accelerations and decelerations of the vehicle driver.

In one exemplary form of the present disclosure, a method for controlling full load mode of a hybrid vehicle by a controller is provided. The method includes: calculating, by a driver demand torque calculation part, a driver demand torque based on at least one of acceleration pedal position sensor (APS) information or brake pedal position sensor (BPS) information; predicting, by an acceleration/deceleration prediction modeling part, acceleration/deceleration information based on driving information of the hybrid vehicle; predicting, by the controller, the driver demand torque based on the predicted acceleration/deceleration information; predicting, by the controller, a state of charge (SOC) of a battery configured to supply electric power to a motor configured to drive the hybrid vehicle, based on the calculated driver demand torque and the predicted driver demand torque; and controlling, by the controller, an engine so as to charge the battery based on the predicted battery SOC, and to keep the hybrid vehicle from entering into a full load mode where the engine configured to produce a maximum torque and the motor are used.

The method for controlling the full load mode of a hybrid vehicle may further include determining, by the controller, if the predicted battery SOC is lower than a battery SOC that reduces the motor's output. In particular, if the predicted battery SOC is lower than the battery SOC that reduces the motor's output, the controller may control the engine to produce a maximum torque which is lower than the engine's torque in the full load mode, thereby allowing the hybrid vehicle to enter into a maximum torque mode of part load mode by charging the battery.

The method for controlling the full load mode of a hybrid vehicle may further include determining, by the controller, if the predicted battery SOC is lower than a battery SOC that reduces the motor's output. If the predicted battery SOC is not lower than the battery SOC that reduces the motor's output, the controller may control the engine to achieve maximum engine efficiency, thereby allowing the hybrid vehicle to operate at an optimal operating point.

The hybrid vehicle's driving information may include at least one of radar information, navigation information, or driver behavior information.

The acceleration/deceleration prediction modeling part may predict the driver's acceleration/deceleration information based on a neural network model created from the at least one of the radar information, the navigation information, or the driver behavior information.

The radar information may include a relative distance from a vehicle in front of the hybrid vehicle, a speed of the vehicle in front, or an acceleration speed of the vehicle in front.

The driver behavior information may include an average speed, an accelerator pedal position change value, or a brake pedal position change value of the hybrid vehicle.

Another exemplary form of the present disclosure provides a device for controlling a full load mode of a hybrid vehicle, the device including: a driver demand torque calculation part configured to calculate driver demand torque based on acceleration pedal position sensor (APS) information or brake pedal position sensor (BPS) information; an acceleration/deceleration prediction modeling part configured to predict acceleration/deceleration information based on the driving information of the hybrid vehicle; and a controller configured to predict the driver demand torque based on the predicted acceleration/deceleration information. In particular, the controller may predict a state of charge (SOC) of a battery that supplies electric power to a motor for driving the hybrid vehicle, based on the calculated driver demand torque and the predicted driver demand torque, and the controller may control an engine for charging the battery based on the predicted battery SOC, in order to keep the hybrid vehicle from entering into a full load mode in which the engine producing maximum torque and the motor are used.

When the predicted battery SOC is lower than a battery SOC that reduces the output of the motor, the controller may control the engine to produce a maximum torque which is lower than the engine's torque in the full load mode, thereby allowing the hybrid vehicle to enter into a maximum torque mode of part load mode by charging the battery.

When the predicted battery SOC is not lower than the battery SOC that reduces the motor's output, the controller may control the engine to achieve maximum engine efficiency, thereby allowing the hybrid vehicle to operate at an optimal operating point.

The hybrid vehicle's driving information may include radar information, navigation information, or driver behavior information.

The acceleration/deceleration prediction modeling part may predict the driver's acceleration/deceleration information based on a neural network model created from the radar information, the navigation information, or the driver's behavior information.

The radar information may include a relative distance from a vehicle in front of the hybrid vehicle, a speed of the vehicle in front, or an acceleration speed of the vehicle in front.

The driver behavior information may include an average speed, an accelerator pedal position change value, or a brake pedal position change value of the hybrid vehicle.

The above-described method and device for controlling a full load mode of a hybrid vehicle in exemplary forms of the present disclosure may reduce the frequency (or number of times) of the vehicle's entering into the full load mode by predicting the vehicle's entry into the full load mode through prediction of accelerations and decelerations of a driver.

Furthermore, the exemplary form of the present disclosure may reduce or prevent a decrease in the drivability and in fuel efficiency of a vehicle, caused by the vehicle's entry into the full load mode, by predicting the vehicle's entry into the full load mode and controlling the vehicle to operate in a part load mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
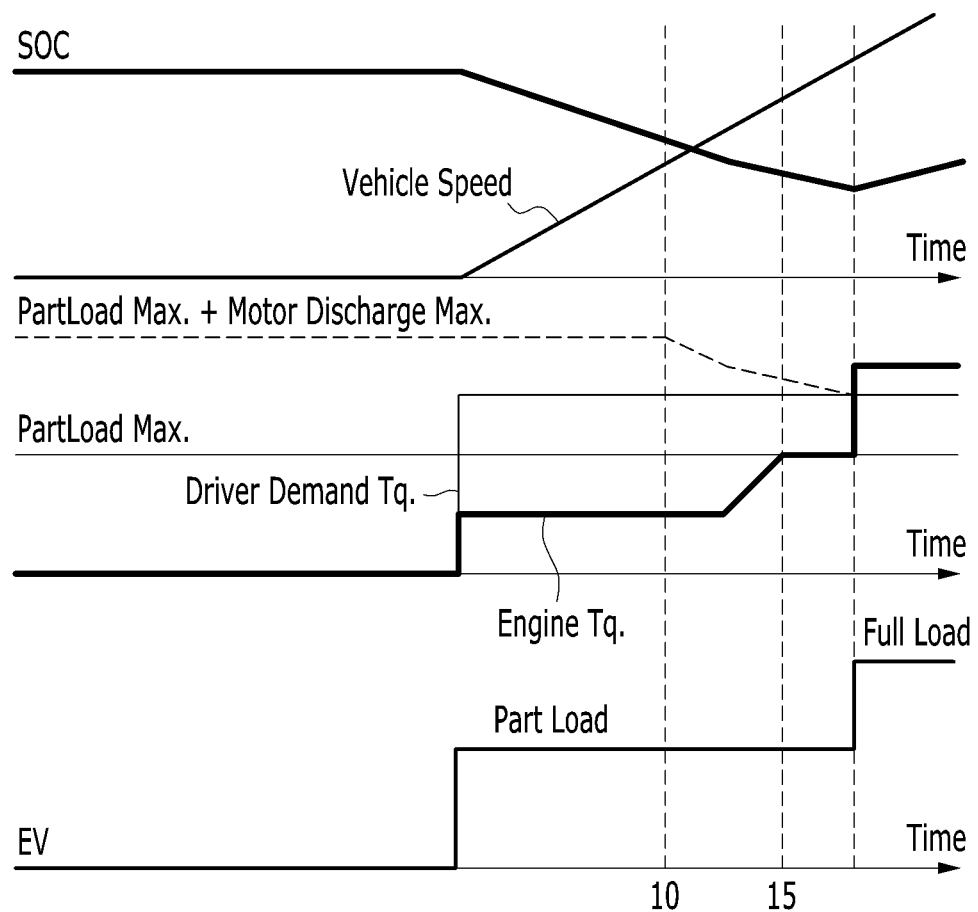
FIG. 1 is a view (timing diagram) illustrating a process in which a hybrid vehicle enters into a full load mode.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the present disclosure, well-known configurations or functions will not be described in detail since they may unnecessarily obscure the gist of the present disclosure.

Terms used in the present specification are used only in order to describe specific exemplary forms rather than limiting the present disclosure. Singular forms are to include plural forms unless the context clearly indicates otherwise. It will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Throughout this specification and the claims that follow, when it is described that an element is "connected" to another element, the element may be "directly connected" to the other element or "electrically or mechanically connected" to the other element through a third element.

Unless being defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

In a powertrain (PT) mode (or driving mode) of a hybrid vehicle (HEV), a Parallel Mode may be divided (classified) into a Part Load mode and a Full Load mode. The Part Load mode and the Full Load mode may be classified based on driver demand power. If more than a certain level of engine power is desired in response to a driver demand torque, the hybrid vehicle may be controlled in the Full Load mode, and if less than a certain level of engine power is desired in response to a driver demand torque, the hybrid vehicle may be controlled in the Part Load mode.

When the hybrid vehicle enters into a Full Load mode, an engine torque demand becomes equal to the maximum engine torque, and the motor (or drive motor) produces a torque corresponding to the difference between the engine torque and the torque demand in order to meet the torque demand. In this case, the engine may be in fuel enrichment state since the maximum engine torque is demanded. Due to this reason, there is a difference in engine efficiency between part load mode control and full load mode control.

A mixture gas or mixed gas used for combustion of an internal combustion engine is composed of air and fuel. The ratio of air to fuel in the mixture gas is referred to as air-fuel ratio. The stoichiometric air-fuel ratio for a gasoline engine is known to be 14.3:1. If air content is higher than the stoichiometric ratio, the mixture is said to be "fuel-lean", and if fuel content is higher than the stoichiometric ratio, the mixture is said to be "fuel-rich".

In fuel-rich mixtures, combustion in the engine results in more by-products and lower engine efficiency. Nevertheless, they have the benefit of producing high power. Thus, rich burning is used only when the engine desires high power. The fuel enrichment state of the engine refers to a state in which a rich mixture is used for combustion to allow the engine to produce high power. In this case, the throttle valve is fully open.

The decision of whether a vehicle such as a hybrid electric vehicle (HEV) or a plug-in hybrid electric vehicle (PHEV) will enter into a Full Load mode or not may be made by the following equation. The vehicle may enter into the Full Load mode if the equation is satisfied as:

Driver Demand Torque (or Driver Demand Power)>Engine Part Load mode Maximum Torque (or Engine Part Load mode Maximum Power)+Motor Discharge Maximum Torque (or Motor Discharge Maximum Power).

If a state of charge (SOC) of a battery that supplies electric power to the motor is low (that is, the battery is discharged), the battery output decreases, thereby reducing the motor's output (or the motor's torque), as illustrated in FIG. 1. Accordingly, the decision of whether the vehicle will enter into the Full Load mode by the equation above may depend on the state of charge (SOC) of the battery. Therefore, if SOC is low, the vehicle enters into the Full Load mode even if the driver demand torque is the same, thus reducing the fuel efficiency of the vehicle.

If SOC is at a normal level (at which the battery does not need to be charged or discharged) or SOC exceeds an SOC that reduces the motor's output, which involves the use of an operating point where system efficiency (or engine efficiency) is optimal. Control using the most efficient operating point regardless of SOC charging and discharging is referred to as optimal operation line (OOL) control. OOL control is excellent in terms of fuel efficiency, but low in SOC balancing performance.

If a SOC is lower than normal, the SOC is maintained by increasing the engine's output. If the SOC is still low even with increasing engine output, the engine output continues to rise and then reaches at a Part Load Max torque (or Part Load Max power). The Part Load Max torque is the maximum output the engine can produce unless the vehicle enters into a Full Load mode. Thus, the engine produces the Part Load Max torque. Such control is referred to as Max Part Load mode control (or Part Load Max mode control). Such control continues until the SOC rises or the vehicle enters into Full Load mode.

FIG. 1 is a view (timing diagram) illustrating a process in which a hybrid vehicle enters into a Full Load mode in one form of the present disclosure.

Referring to FIG. 1, reference numeral 10 indicates a point in time when motor output decreases due to a decrease in the battery's SOC, and Max Part Load mode control starts at a Max Part Load mode control start point 15.

SOC decreases upon entering into a Full Load mode in FIG. 1, and then Part Load Max mode control is performed. This may be disadvantageous to maintaining the battery's SOC.

Figure 2:
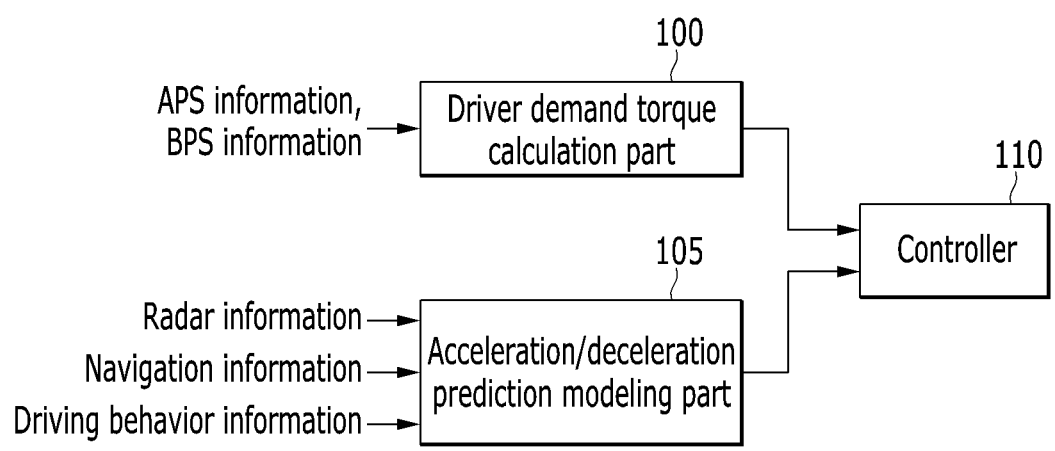
FIG. 2 is a block diagram illustrating a device for controlling a full load mode of a hybrid vehicle.
Figure 5:
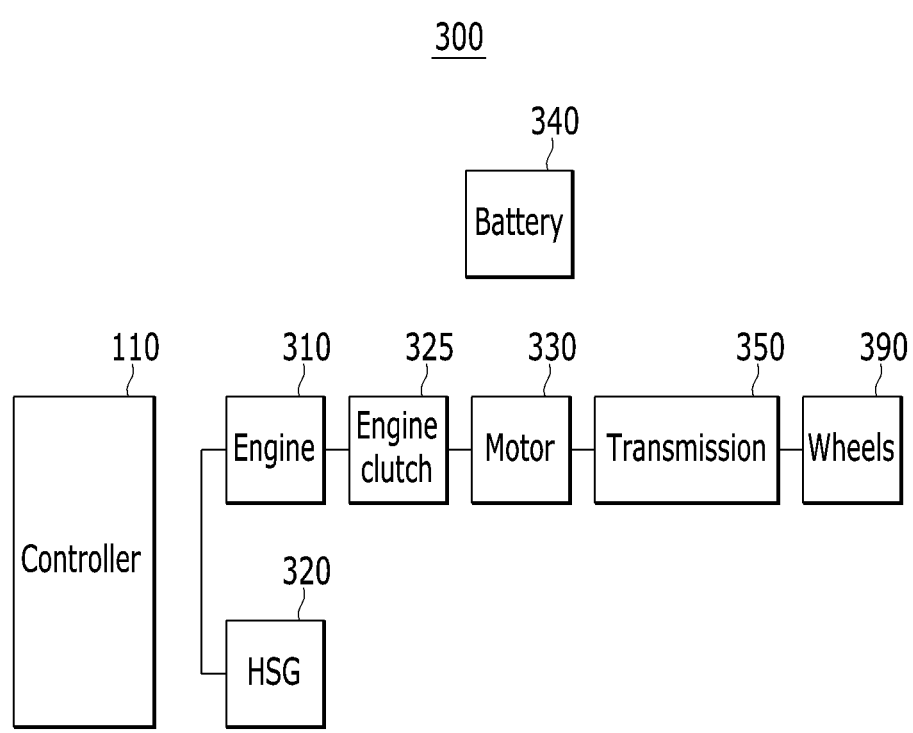
FIG. 5 is a block diagram illustrating a hybrid vehicle to which a method for controlling full load mode of a hybrid vehicle.

FIG. 2 is a block diagram illustrating a device for controlling full load mode of a hybrid vehicle in one exemplary form of the present disclosure. FIG. 5 is a block diagram illustrating a hybrid vehicle to which a method for controlling full load mode of a hybrid vehicle in one exemplary form of the present disclosure is applied.

Referring to FIG. 2 and FIG. 5, a device for controlling full load mode of a hybrid vehicle includes a driver demand torque calculation part (or a driver demand torque calculator) 100, an acceleration/deceleration prediction modeling part (or an acceleration/deceleration prediction model) 105, and a controller 110.

The device for controlling a full load mode of a hybrid vehicle may configure a short-period (e.g., 5 seconds or less) acceleration/deceleration prediction model in response to various signal inputs such as radar information, navigation information, driving behavior information, etc. and utilize it for the vehicle's operating point control.

The driver demand torque calculation part 100 may calculate driver demand torque (or current demand torque) based on acceleration pedal position sensor (APS) information or brake pedal position sensor (BPS) information.

The acceleration/deceleration prediction modeling part 105 may predict the driver's acceleration/deceleration information (or acceleration/deceleration will information) based on the hybrid vehicle 300's driving information. The hybrid vehicle 300's driving information may include radar information, navigation information, or driver behavior information.

The radar information is information that is detected by a radar system (radar device) included in the hybrid vehicle 300, which may include the relative distance from the vehicle in front of it, the speed of the vehicle in front of it, or the acceleration speed of the vehicle in front of it.

The navigation information is information that is detected by a navigation system in the hybrid vehicle 300, which may include road type information, road congestion information, road speed limit information, road inclination information, speed camera location information, vehicle turn direction information, intersection location information, or tollgate location information.

The driving behavior information may include the average speed of the vehicle 300 the driver is driving, the accelerator pedal position change value (or accelerator pedal position deviation) (dAPS) of the vehicle, or the brake pedal position change value (dBPS) of the vehicle.

The acceleration/deceleration prediction modeling part 105 may learn (or create) a driver acceleration/deceleration model by using a machine learning technique. The acceleration/deceleration prediction modeling part 105 may include a neural network, for example.

The acceleration/deceleration prediction modeling part 105 is a driver acceleration/deceleration will prediction model, by which the driver's future will that suits the current driving condition may be created through machine learning from big data accumulated from actual operations of the vehicle.

For example, if navigation information input into the acceleration/deceleration prediction modeling part 105 (or telematics information provided from a telematics multimedia system (TMS) center shows that road type is expressway, traffic is smooth, and there is no event in front of the vehicle, radar information shows that the vehicle 300 is at a close distance from the vehicle in front and the speed relative to the vehicle in front is −10 KPH (kilometers per hour), driving behavior information shows that there is a history of constant speed driving for 5 minutes, and the vehicle's lane departure prevention system is keeping the vehicle 300 in lane, the acceleration/deceleration prediction modeling part 105 may analyze the driving situation and determine that the driver has braked the vehicle intermittently to maintain a distance from the vehicle ahead during constant speed driving. Also, predicted APS information output from the acceleration/deceleration prediction modeling part 105 may show an acceleration pedal position value of 0, and predicted BPS information output from the acceleration/deceleration prediction modeling part 105 may show a low brake pedal position value.

If navigation information shows that road type is expressway, traffic is smooth, and there is an event occurred 200 m before a tollgate, radar information shows that there is no vehicle in front and there is no speed relative to the vehicle in front, driving behavior information shows that there is a history of an average vehicle speed of 50 kph (kilometers per hour) when passing through a tollgate, and the vehicle's lane departure prevention system is keeping the vehicle 300 in lane, the acceleration/deceleration prediction modeling part 105 may analyze the driving situation and determine that the driver has dropped the speed to as low as 50 kph so as to pass through a tollgate while driving on an expressway. Also, predicted APS information output from the acceleration/ deceleration prediction modeling part 105 may show an acceleration pedal position value of 0, and predicted BPS information output from the acceleration/deceleration prediction modeling part 105 may show an intermediate brake pedal position value.

The controller 110 may predict driver demand torque based on the predicted acceleration/deceleration information.

The controller 110 may predict the state of charge (SOC) of a battery 340 that supplies electric power to a motor 330 for driving the hybrid vehicle 300, based on the calculated driver demand torque and the predicted driver demand torque, and the controller 110 may control an engine for charging the battery 340 based on the predicted battery SOC, in order to keep the hybrid vehicle 300 from entering into full load mode in which the engine 310 produces maximum torque and both the engine 310 and the motor 330 are used.

The controller 110 may control the driving mode of the hybrid vehicle 300 based on predicted APS and BPS information output from a learned acceleration/deceleration model and a driver demand torque output from the driver demand torque calculation part 100.

Additionally, the controller 110 may use a prediction model for deciding which driving mode to drive the vehicle in EV mode or HEV mode, when deciding whether to drive the hybrid vehicle 300 in electric vehicle (EV) mode or hybrid electric vehicle (HEV) mode by using current driving data.

The hybrid vehicle 300 includes the controller 110, the engine 310, a hybrid starter & generator (HSG) 320, an engine clutch 325, a motor (or drive motor) 330 which may be an electric motor, the battery 340, a transmission 350, and driving wheels 390, which are car wheels.

The hybrid vehicle 300 is a hybrid electric vehicle, may use the engine 310 and the motor 330 as power sources, and has the engine clutch 325 between the motor 330 and the engine 310. Thus, when the engine clutch 325 is open, the hybrid vehicle 300 may operate in electric vehicle (EV) mode in which it is driven by the motor 330, and when the engine clutch 325 is closed, the hybrid vehicle 300 may operate in hybrid electric vehicle (HEV) mode in which it is driven by the motor 330 and the engine 310 both.

The hybrid vehicle 300 may include a transmission mounted electric device (TMED) powertrain with the motor 330 and the transmission 350 attached to it. Depending on whether the engine clutch 325, located between the power sources including the engine 310 and the motor 330, is engaged or not, the hybrid vehicle 300 may provide electric vehicle mode (EV) mode, which is a pure electric vehicle mode in which only the motor 330's power is used, and hybrid electric vehicle (HEV) mode, which uses the engine 310's rotational force as main power and the motor 330's rotational force as auxiliary power. Additionally, in the hybrid vehicle 300, in which the motor 330 is directly connected to the transmission 350, the engine RPM (revolutions per minute) may be raised by starting the hybrid starter & generator (HSG) 320, the engine 310's power may be transmitted or cut off by engaging or disengaging the clutch 325, driving force may be generated on the wheels 390 through a power transmission system that may include the transmission 350, and engine torque may be transmitted through engagement of the clutch 325 when there is a demand to transmit the engine 310's torque.

The controller 110 may include a hybrid control unit HCU, a motor control unit MCU, an engine control unit ECU, and a transmission control unit TCU.

The hybrid control unit HCU may control the starting (startup) of the engine 310 through control of the HSG 320 when the engine 310 is stopped. The HCU is the top-level controller, and may perform overall control (namely integrated control) over the control units including the motor control unit MCU, which is connected to a vehicle network such as a controller area network (CAN), and control the overall operation of the hybrid vehicle 300.

The motor control unit MCU may control the HSG 320 and the motor 330. The motor control unit MCU may control the output torque of the drive motor 330 in response to a control signal output from the hybrid control unit HCU via the network to allow the motor 330 to operate in the highest efficiency region. The motor control unit MCU includes an inverter consisting of a plurality of power switching elements. A power switching element included in the inverter may include an insulated gate bipolar transistor (IGBT), a field effect transistor (FET), a metal oxide semiconductor FET (MOSFET), a transistor, or a relay. The inverter may convert a DC voltage (direct current voltage) supplied from the battery 340 to a 3-phase AC voltage to drive the drive motor 330. The motor control unit MCU may be disposed between the battery 340 and the motor 330.

The engine control unit ECU may control the engine 310's torque. The engine control unit ECU may control the operating point of the engine 310 in response to a control signal output from the hybrid control unit HCU via the network so as to produce optimal torque. The transmission control unit TCU may control the operation of the transmission 350.

The controller 110 may be, for example, one or more microprocessors which are run by a program, or hardware including the microprocessor(s). The program may include a series of instructions for performing the method for controlling full load mode of a hybrid vehicle according to an exemplary form of the present disclosure.

The engine 310 may include one among a diesel engine, a gasoline engine, an LPG engine, and an LNG engine, and may produce torque at an operating point corresponding to a control signal output from the engine control unit and keep it properly combined with the drive force of the drive motor 330 in HEV mode.

The engine 310 may be coupled to the motor 330 through the engine clutch 325 and produce and send power to the transmission 350.

The hybrid starter & generator (HSG) 320 acts as an electric motor or electric generator. The hybrid starter & generator (HSG) 320 may act as an electric motor in response to a control signal output from the motor control unit MCU to start the engine 310. The hybrid starter & generator (HSG) 320 may act as an electric generator to generate a voltage while the engine 310 is on, and provide the generated voltage as a charging voltage to the battery 340 through the inverter. The hybrid starter & generator (HSG) 320 may be connected to the engine 310 via a belt. The HSG 320 is a motor for cranking the engine 310, and may be connected to the engine 310 directly or via a belt.

The engine clutch 325 may be disposed (mounted) between the engine 310 and the drive motor 330 to control power transmission (power connection) and operate the vehicle in EV mode and HEV mode. The operation of the engine clutch 325 may be controlled by the controller 110.

The drive motor 330 may operate by a 3-phase AC voltage output from the motor control unit MCU and produce torque, and may act as an electric generator under coasting drive or regenerative braking and supply regenerative energy to the battery 340.

The battery 340 includes a plurality of unit cells, and may store a high DC voltage of 350-450 V, for example, to supply voltage to the drive motor 330 that provides driving force to the wheels 390.

The transmission 350 may be implemented as a multiple speed transmission or multistage transmission such as an automatic transmission or dual clutch transmission (DCT), and may shift to a desired gear by using hydraulic pressure depending on control of the TCU to operate engagement elements and disengagement elements.

The transmission 350 may transmit the driving force of the engine 310 and/or motor 330 to the wheels 390 or interrupt it.

Figure 3:
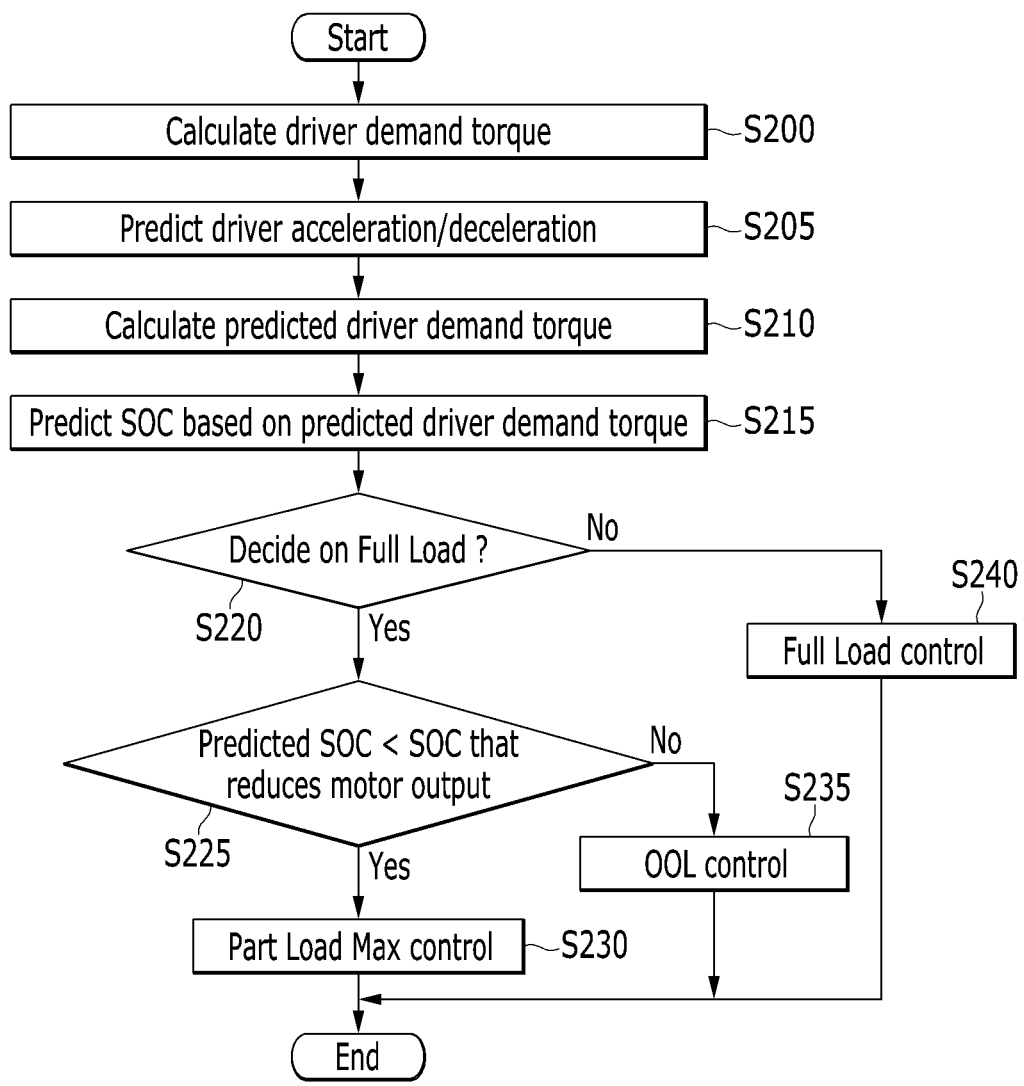
FIG. 3 is a flowchart illustrating a method for controlling a full load mode of a hybrid vehicle.

FIG. 3 is a flowchart illustrating a method for controlling a full load mode of a hybrid vehicle in one exemplary form of the present disclosure. The method for controlling full load mode of a hybrid vehicle may be applied to the device shown in FIG. 2 or the vehicle shown in FIG. 5.

Referring to FIG. 2, FIG. 3, and FIG. 5, in the calculation step S200, the controller 110 may calculate driver demand torque (or current demand torque) based on acceleration pedal position sensor (APS) information or brake pedal position sensor (BPS) information.

In the prediction step S205, the controller 110 may predict the driver's acceleration/deceleration information (or acceleration/deceleration will information) based on the hybrid vehicle 300's driving information. The hybrid vehicle 300's driving information may include radar information, navigation information, or driver behavior information.

In the prediction step S210, the controller 110 may predict driver demand torque based on the predicted acceleration/deceleration information.

In the prediction step S215, the controller 110 may predict the state of charge (SOC) of a battery 340 that supplies electric power to the motor 330 for driving the vehicle 300, based on the calculated driver demand torque and the predicted driver demand torque.

In the decision step S220, the controller 110 may decide whether the vehicle 300 will enter into a full load mode or not, based on the current driver demand torque and the current SOC of the battery 340.

When the vehicle 300 needs to enter into the full load mode, the process corresponding to the method for controlling the full load mode of a hybrid vehicle proceeds to the control step S240. In the control step S240, the controller 110 may control the engine 310 to produce maximum torque to allow the vehicle 300 to enter into the full load mode.

When the vehicle 300 does not need to enter into the full load mode, the process proceeds to the comparison step S225. In the comparison step S225, the controller 110 may determine if the predicted battery SOC is lower than the battery 340's SOC that reduces the motor 330's output.

When the predicted battery SOC is lower than the battery 340's SOC that reduces the motor 330's output, the process proceeds to the control step S230. In the control step S230, in order to avoid a decrease in the battery 340's SOC, the controller 110 may control the engine 300 to produce a maximum torque which is lower than the engine's torque in the full load mode, thereby allowing the vehicle 300 to enter into a maximum torque mode of part load mode by charging the battery. Additionally, the controller 110 may control the engine 310 in such a way that the vehicle 300 does not enter into the full load mode, based on the predicted battery SOC. In the full load mode, the engine 310 may produce maximum torque, and both the engine 310 and the motor 330 may be used. The Full load mode and the part load mode may be included in a HEV mode. The controller 110 may charge the battery 340 by using the HSG 320 connected to the engine 310.

When the predicted battery SOC is not lower than the battery 340' SOC that reduces the motor 330's output, the process proceeds to the OOL control step S235. In the OOL control step S235, the controller 110 may control the engine 310 (or the engine's torque) to achieve maximum engine efficiency, thereby allowing the vehicle 300 to operate (or be driven) at an optimal operating point.

Figure 4:
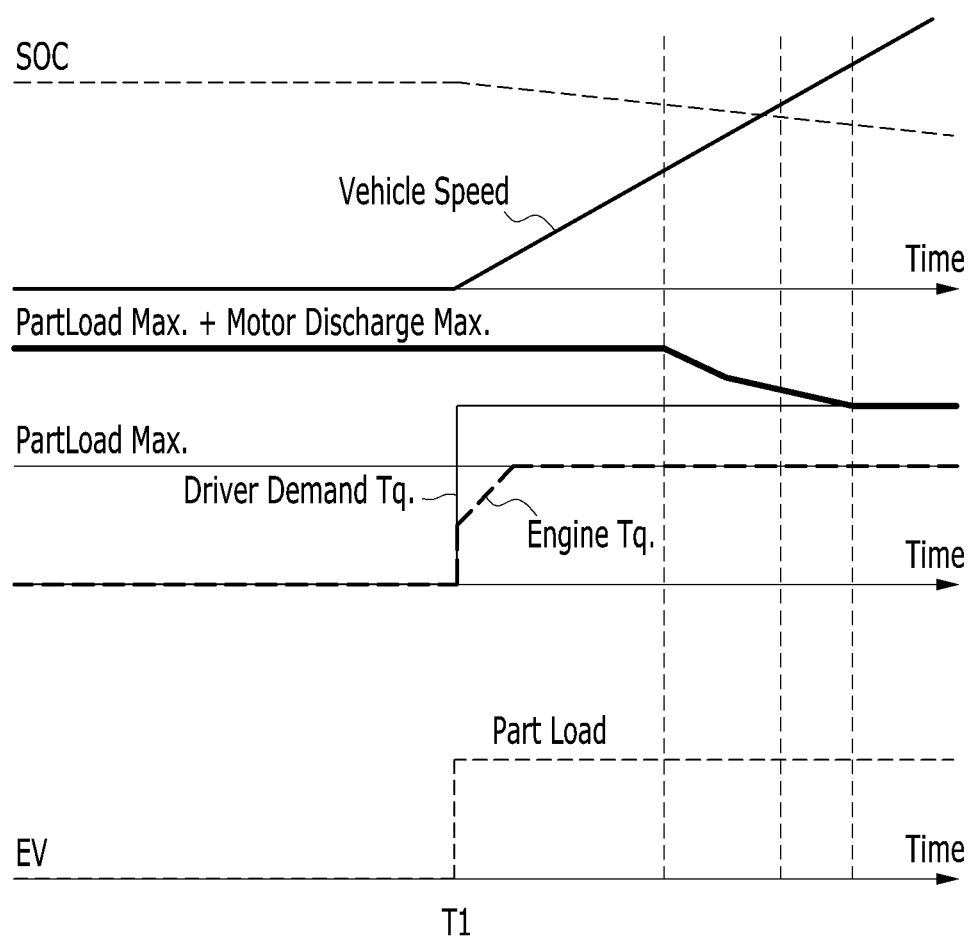
FIG. 4 is a timing diagram illustrating the driving mode of a hybrid vehicle according to the method for controlling a full load mode of a hybrid vehicle, shown in FIG. 3.

FIG. 4 is a timing diagram illustrating the driving mode of a hybrid vehicle according to the method for controlling full load mode of a hybrid vehicle, shown in FIG. 3.

Referring to FIG. 4, at a specific time T1, the controller 110 may predict a decrease in the battery 340's SOC based on a predicted driver demand torque and control the engine 310's torque so that the hybrid vehicle 300 enters into a maximum torque mode (PartLoad Max.) of part load mode in an EV mode.

Accordingly, in an exemplary form of the present disclosure, the vehicle 300 enters into the maximum torque mode of part load mode at an early stage, thereby decreasing the rate of decrease in the battery 340's SOC and inhibiting the occurrence of the full load mode resulting from a SOC reduction.

The components, "~unit", block, or module which are used in the present exemplary form may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed in a combination of the software and the hardware. The components, 'part', or the like may be embedded in a computer-readable storage medium, and some part thereof may be dispersedly distributed in a plurality of computers.

As set forth above, exemplary forms have been disclosed in the accompanying drawings and the specification. Herein, specific terms have been used, but are just used for the purpose of describing the present disclosure and are not used for qualifying the meaning or limiting the scope of the present disclosure. Therefore, it will be understood by those skilled in the art that various modifications and equivalent exemplary forms are possible from the present disclosure. Accordingly, the actual technical protection scope of the present disclosure must be determined by the spirit of the present disclosure.

What is claimed is:

1. A method for controlling a full load mode of a hybrid vehicle by a controller, the method comprising:
    calculating, by a driver demand torque calculation part, a driver demand torque based on at least one of acceleration pedal position sensor (APS) information or brake pedal position sensor (BPS) information;
    predicting, by an acceleration/deceleration prediction modeling part, acceleration/deceleration information based on driving information of the hybrid vehicle;
    predicting, by the controller, the driver demand torque based on the predicted acceleration/deceleration information;
    predicting, by the controller, a state of charge (SOC) of a battery configured to supply electric power to a motor configured to drive the hybrid vehicle, based on the calculated driver demand torque and the predicted driver demand torque;
    controlling, by the controller, an engine so as to charge the battery based on the predicted battery SOC, and to keep the hybrid vehicle from entering into a full load mode where the engine is configured to produce a maximum torque and the motor is configured to produce a torque corresponding to a difference between the calculated driver demand torque and the maximum torque of the engine in the full load mode, and
    determining, by the controller, whether the predicted battery SOC is lower than a battery SOC that reduces an output of the motor,
    wherein, when the predicted battery SOC is lower than the battery SOC that reduces the output of the motor, the controller is configured to control the engine to increase a torque of the engine to a maximum torque in a part load mode where the battery is charged by the engine, and
    wherein the maximum torque of the engine in the part load mode is lower than the maximum torque of the engine in the full load mode.

2. The method of claim 1,
    wherein, when the predicted battery SOC is not lower than the battery SOC that reduces the output of the motor, the controller is configured to control the engine to operate at an optimal operating point of the hybrid vehicle.

3. The method of claim 1, wherein the driving information of the hybrid vehicle comprises at least one of radar information, navigation information, or driver behavior information.

4. The method of claim 3, wherein the acceleration/deceleration prediction modeling part is configured to predict the acceleration/deceleration information based on a neural network model created from the at least one of the radar information, the navigation information, or the driver behavior information.

5. The method of claim 3, wherein the radar information comprises a relative distance from a vehicle in front of the hybrid vehicle, a speed of the vehicle in front, or an acceleration speed of the vehicle in front.

6. The method of claim 3, wherein the driver behavior information comprises an average speed, an accelerator pedal position change value, or a brake pedal position change value of the hybrid vehicle.

7. A device for controlling a full load mode of a hybrid vehicle, the device comprising:
    a driver demand torque calculation part configured to calculate a driver demand torque based on acceleration pedal position sensor (APS) information or brake pedal position sensor (BPS) information;
    an acceleration/deceleration prediction modeling part configured to predict acceleration/deceleration information based on driving information of the hybrid vehicle; and
    a controller configured to predict the driver demand torque based on the predicted acceleration/deceleration information,
    wherein the controller is configured to predict a state of charge (SOC) of a battery that is configured to supply electric power, based on the calculated driver demand torque and the predicted driver demand torque, to a motor that is configured to drive the hybrid vehicle, and wherein the controller is configured to control an engine so as to charge the battery based on the predicted battery SOC, and to keep the hybrid vehicle from entering into a full load mode where the engine is configured to produce a maximum torque and the motor is configured to produce a torque corresponding to a difference between the calculated driver demand torque and the maximum torque of the engine in the full load mode,
    wherein, when the predicted battery SOC is lower than a battery SOC that reduces an output of the motor, the controller is configured to control the engine to increase a torque of the engine to a maximum torque in a part load mode where the battery is charged by the engine, and
    wherein the maximum torque of the engine in the part load mode is lower than the maximum torque of the engine in the full load mode.

8. The device of claim 7, wherein, when the predicted battery SOC is not lower than the battery SOC that reduces the output of the motor, the controller is configured to control the engine to operate at an optimal operating point of the hybrid vehicle.

9. The device of claim 7, wherein the driving information of the hybrid vehicle comprises at least one of radar information, navigation information, or driver behavior information.

10. The device of claim 9, wherein the acceleration/deceleration prediction modeling part is configured to predict the acceleration/deceleration information based on a neural network model created from the at least one of the radar information, the navigation information, or the driver behavior information.

11. The device of claim 9, wherein the radar information comprises a relative distance from a vehicle in front of the hybrid vehicle, a speed of the vehicle in front, or an acceleration speed of the vehicle in front.

12. The device of claim 9, wherein the driver behavior information comprises an average speed, an accelerator pedal position change value, or a brake pedal position change value of the hybrid vehicle.

* * * * *